United States Patent
Fieremans et al.

(10) Patent No.: US 7,756,120 B2
(45) Date of Patent: Jul. 13, 2010

(54) METHOD FOR TAGGING SIP CONTACT HEADERS WHILE PRESERVING THE CONTACT HEADER FORMAT TOWARDS SOFTSWITCHES

(75) Inventors: Geert Fieremans, Boca Raton, FL (US); Thomas Nagel, Boca Raton, FL (US); Johannes Ruetschi, Boca Raton, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 438 days.

(21) Appl. No.: 11/906,027

(22) Filed: Sep. 27, 2007

(65) Prior Publication Data

US 2008/0219265 A1 Sep. 11, 2008

Related U.S. Application Data

(60) Provisional application No. 60/906,011, filed on Mar. 9, 2007.

(51) Int. Cl.
*H04L 12/66* (2006.01)
*H04L 12/28* (2006.01)

(52) U.S. Cl. .................. 370/352; 370/392; 370/401

(58) Field of Classification Search ............... 370/252, 370/254, 255, 352–356, 359, 392, 401
See application file for complete search history.

(56) References Cited

U.S. PATENT DOCUMENTS

| | | | |
|---|---|---|---|
| 7,564,835 B1* | 7/2009 | Grabelsky et al. ............ | 370/352 |
| 2004/0095925 A1* | 5/2004 | Cody et al. .................. | 370/352 |
| 2006/0098624 A1* | 5/2006 | Morgan et al. ............... | 370/352 |
| 2007/0104183 A1* | 5/2007 | Bakke et al. ................. | 370/352 |
| 2007/0189220 A1* | 8/2007 | Oberle et al. ................ | 370/331 |
| 2007/0226361 A1* | 9/2007 | Shaikh et al. ............... | 709/230 |
| 2008/0298237 A1* | 12/2008 | Dos Remedios et al. .... | 370/233 |

* cited by examiner

*Primary Examiner*—Hong Cho

(57) ABSTRACT

A private communications network and method of managing calls in a private communications network. A Session Border Controller (SBC) listens for private network voice communications originating from private communications devices, e.g., Session Initiation Protocol (SIP) devices sending/receiving Voice over Internet Protocol (VoIP) communications such as SIP messages. The SBC assigns a unique port to each registering communications device and adds a path header with a single, common SBC port to the SIP register messages. A softswitch responds by adding a route header to identified voice communications. Thereafter, all identified voice communications pass through a single, common SBC port.

18 Claims, 5 Drawing Sheets

METHOD FOR TAGGING SIP CONTACT HEADERS WHILE PRESERVING THE CONTACT HEADER FORMAT TOWARDS SOFTSWITCHES

CROSS REFERENCE TO RELATED APPLICATION

The present invention is a continuation of Provisional U.S. Patent Application No. 60/906,011, entitled "METHOD FOR TAGGING SIP CONTACT HEADERS WHILE PRESERVING THE CONTACT HEADER FORMAT TOWARDS SOFTSWITCHES" to Geert Fieremans et al., filed Mar. 9, 2007 assigned to the assignee of the present invention and is incorporated herein by reference.

BACKGROUND OF THE INVENTION

1. Field of the Invention

The present invention is related to Voice over Internet Protocol (VoIP), communications and more particularly, to VoIP communications networks with softswitch support.

2. Background Description

Broadband Internet connections have become ubiquitous. A typical Small Office, Home Office (SOHO), for example, may have a private network where a router couples local devices on the home/office network to a broadband modem, e.g., cable or Digital Subscriber Line (DSL) modem. Typically also, a Dynamic Host Configuration Protocol (DHCP) server residing in the router manages the private network, assigning each connected device a local, private IP address. The broadband modem has a public Internet Protocol (IP) address and connects over high-speed digital cable or a DSL line to the Internet.

Typically, router uses the public IP address on the modem side and exposes a private IP address (usually the DHCP server assigns 192.168.0.1 to the router) on the private network. Typically also, the DHCP server assigns a private IP address (having the form 192.168.0.xxx) to each private network device, i.e., on the home/office side. Frequently, the router also provides Network Address Translation (NAT). If a private network device accesses the Internet, the router opens a port on the modem side. Then using NAT, the router changes the source private IP address and port in the IP header to match the modem's public IP address and newly opened port. Incoming messages for the private network device are then received on the opened port. The router reverses modification of the IP header by changing the destination IP address and port back to the private IP address and port of the private network device. This works fine as long as the body of a message (known as the "payload") itself does not contain IP addresses.

Commercial telecommunications platforms have evolved digital telecommunications devices that allow service providers to deliver IP based telecommunications services. Digital communications such as Voice over IP (VoIP) may, for example, use Session Initiation Protocol (SIP) and Media Gateway Control Protocol (MGCP) for establishing and clearing connections between network stations. See, RFC3722 for SIP messaging standards and definitions. SIP based VoIP calls work well for a relatively simple connection with simple user control, e.g., a single user connected directly to the Internet using a typical user interface. These state of the art connection-oriented signaling protocols extensively embed IP addresses in messages.

Unfortunately, embedding IP addresses in VoIP communications messages can produce serious problems communicating with devices behind a router with activated NAT. Normally, state of the art connection-oriented signaling protocols attempt to route messages to the contact uniform resource indicator (URI) of a registered device. However, as noted hereinabove, in a private network this contact URI is a private IP address. So, instead of being directed to the public IP address of the broadband modem and the respective opened port on the router, return VoIP messages are directed to the not publicly routable private IP address. This private IP address may also be the same for any number of devices on other private networks.

A softswitch is a device that allows multiple contacts for the same user or multiple users to connect from the same device. Including a softswitch for a private communications network may exacerbate the above problem. Consequently, without more, a SIP registrar/SIP server cannot direct messages to SIP devices on a typical private network connected behind a broadband router and, therefore, the SIP server may not be able to reach SIP devices.

Session Border Controllers (SBC) have been added to typical private networks to address this problem. A typical state of the art SBC is a Back-to-Back User-Agent (B2BUA), inserted on the border between 2 distinct networks. The SBC solves NAT problems for network devices in either of the two networks. In VoIP networks SBCs are usually located in what is known as the demilitarized zone (DMZ) of a data center and is the single point of entry for VoIP communications. SBCs provide security for data centers and solve the problems introduced in SIP or MGCP signaling because of NAT devices in the network. For each VoIP device that registers with the SBC, the SBC creates a unique port between the SBC and softswitch and listens on each port.

Opening multiple ports increases the number of active IP connections that the SBC and the softswitch must maintain. Maintaining these connections consumes processing power in the connected devices. Moreover, increasing connections increases network complexity. Also, SBCs may change the user part of the respective contact URI, which causes problems in SIP Registrars that rely on the user part to detect that a user is registering from multiple locations. Parsing and maintaining attached URI tags increases processing power consumption because internally, address associations are based on IP:port structures.

Thus, there is a need for minimizing power consumed in VoIP communications and, more particularly for simplifying SIP communications while minimizing the number of connections between SBCs and softswitches in a typical private network.

SUMMARY OF THE INVENTION

It is a purpose of the invention to minimize processing power consumed in VoIP communications.

It is another purpose of the invention to reduce the number of opened ports between SBCs and softswitches occupied by SIP communications in a typical private network.

It is yet another purpose of the invention to simplify SIP communications while minimizing the number of connections between SBCs and softswitches in a typical private network.

The present invention relates to a private communications network and method of managing calls in a private communications network. A Session Border Controller (SBC) listens for network voice communications originating from communications devices in a remote private network, e.g., Session Initiation Protocol (SIP) devices sending/receiving Voice over Internet Protocol (VoIP) communications such as SIP messages. Instead of opening ports for each received registration from the remote private network, the SBC assigns a unique port number on the SBC interface with the softswitch and adds a path header with a single port to identified voice registration communications from the remote private network. The softswitch responds by adding a route header that matches the received path header to all identified voice communications towards the communications device in the remote private network. Thereafter, all identified voice communications pass through a single, common SBC port.

BRIEF DESCRIPTION OF THE DRAWINGS

The foregoing and other objects, aspects and advantages will be better understood from the following detailed description of a preferred embodiment of the invention with reference to the drawings, in which.

to FIG. 1A which shows a prior art Internet Protocol (IP) communications system including a digital call handling capable network.

DESCRIPTION OF PREFERRED
EMBODIMENTS

Figure 1A:
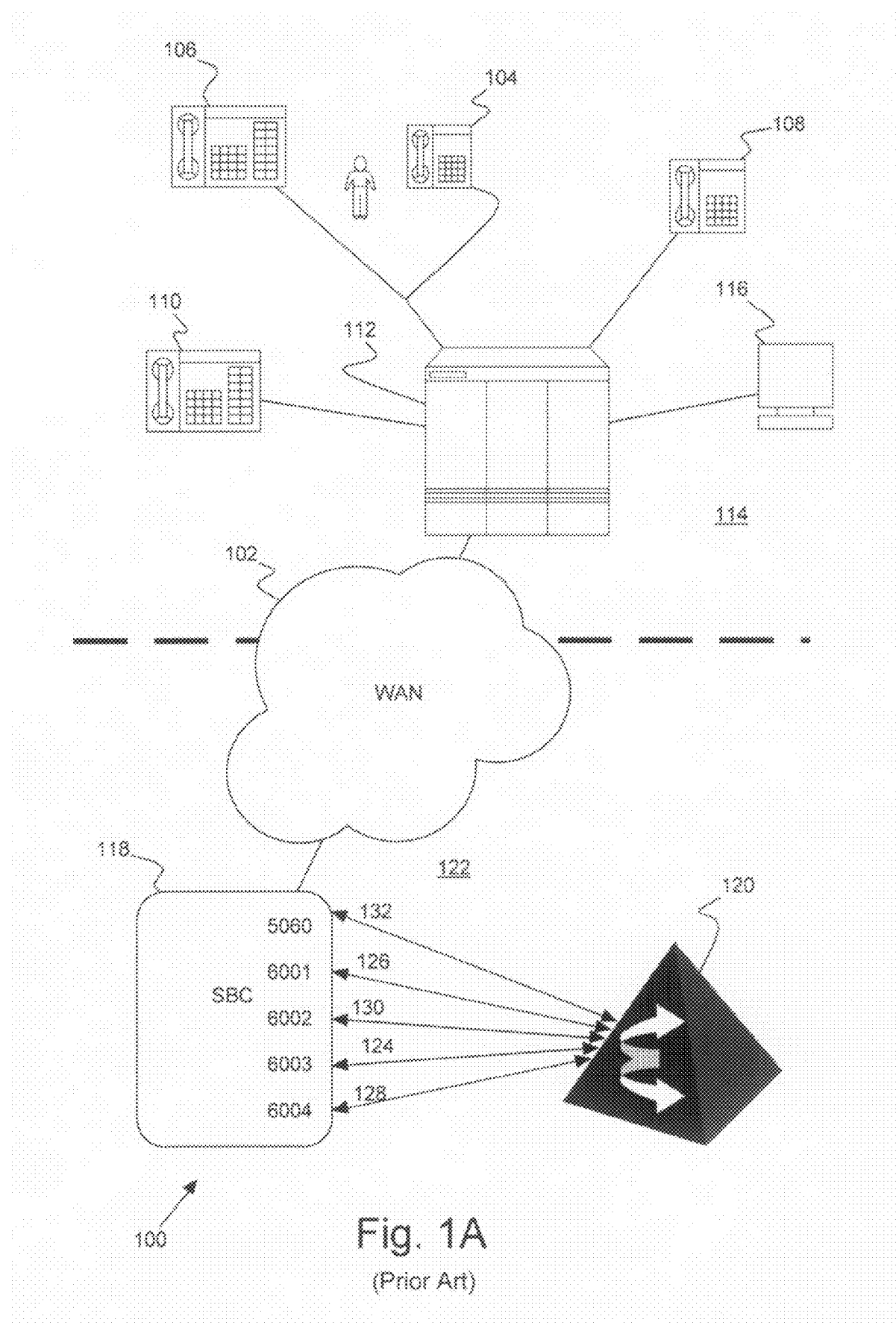
FIG. 1B shows an example of SIP message headers for external calls that highlights how a prior art system handles calls with multiple contact keysets.

Turning now to the drawings, the present invention may be better understood with reference to FIG. 1A which shows a prior art Internet Protocol (IP) communications system 100 including a digital call capable network 102, e.g., a Wide Area Network (WAN), that is capable of Voice over IP (VoIP) communications. The system includes digital telephony devices or keysets 104, 106, 108, 110. More particularly, keysets 104, 106, 108, 110 are Session Initiation Protocol (SIP) capable or SIP enabled keysets, networked with a suitable proxy server 112 providing a router function to private network 114. A gateway 116, e.g., a state of the art media gateway, connects the network externally, e.g., to a public switched telephone network/public land mobile network (PSTN/PLMN). A prior art Session Border Controller (SBC) 118 is connected between the WAN 102 and a softswitch 120. Both the SBC 118 and the softswitch 120 are shown in this example in what is known as the demilitarized zone (DMZ) 122. Typically, however, only the SBC 118 is in the DMZ 122. Normally, the softswitch 120 is in a data center (not shown) that is protected by the DMZ 122. For each corresponding keyset 104, 106, 108, 110 that registers with the SBC 118, the SBC 118 creates a unique port 124, 126, 128, 130 between the SBC 118 and softswitch 120. Then, the SBC 118 listens on each port. The SBC 118 also has a port 132 (e.g., 5060) opened for communications with softswitch 120 port 5060.

Since the four keysets 104, 106, 108 and 110 in this example are on the private network 114, a local DHCP server (e.g. on the broadband router) assigns each a private IP address, e.g., 192.168.254.3-192.168.254.6, respectively, with VoIP communications over an assigned port, e.g., 5060. The media gateway 116 also has an assigned private IP address, e.g., 192.168.254.1. Two features that a typical softswitch (e.g., 120) supports in a business environment, multiple contacts (e.g., 104 and 108) and multiple lines coexisting on the same SIP device (e.g., 106 and 110), may cause problems with VoIP calls.

The softswitch 120 allows multiple lines to coexist on the same SIP device such as, for example, keysets 106 and 110. Each multiple line keyset 106, 110 has a primary directory number (DN) line and one or more secondary DN line (one in this example), referred to herein as DN1 and DN2, and with corresponding extensions 1020, 1021. Specifically for this example, DN1 is the primary line and DN2 is the secondary line for keyset 106; and DN2 is the primary line and DN1 is the secondary line for keyset 110. The softswitch 120 also allows the same user with multiple contacts to connect from multiple different SIP devices, 104 and 108 in this example, using the same shared DN. This shared number is referred to herein as DN3, and corresponds to extension 1004. So, in U.S. area code 561 with exchange code 528, the E164 numbers for DN1, DN2, and DN3 are 15615281020, 15615281021 and 15615281004, respectively.

The router function within the proxy server 112, which is connected to the WAN 102, provides network address translation (NAT) to network devices 104, 106, 108, 110, 116. Also, the proxy server 112 has a public IP address, e.g., 12.147.96.240, listening for VoIP communications on port 5060.

Similarly in the DMZ 122, the SBC 118 connects to WAN 102 with a public IP address, e.g., 12.147.96.226, listening on port 5060 assigned VoIP communications. Also, the softswitch 120 connects to SBC 118 over a private data center network with each assigned a private IP address, e.g., 10.152.128.102 and 10.152.128.253, respectively. The softswitch 120 provides an extended feature set to keyset 104, 106, 108, 110 users on the private network 114, e.g., legacy private telecommunications system features such as call forwarding, voice mail, and lifeline E911 dialing.

The SBC 118 is in the signaling and/or media path between calling and called parties in each VoIP call. With each call from the softswitch 120 to a VoIP phone, the SBC 118 acts as if it were the called VoIP phone and places a second call to the called party. The SBC 118 accomplishes this by opening a unique listening port on the interface to the private network 114 for each VoIP device 104, 106, 108, 110 and the softswitch 120. So for each keyset 104, 106, 108, 110 in this example, the SBC 118 includes a corresponding opened port, e.g., 6003, 6001, 6004 and 6002, respectively. Table 1 shows an example of dynamic port assignment for the example of FIG. 1A.

TABLE 1

Dynamic port Assignment

| Port | Phone | Device |
|------|-------|--------|
| 6001 | 192.168.254.4:5060 | 106 |
| 6002 | 192.168.254.6:5060 | 110 |
| 6003 | 192.168.254.3:5060 | 104 |
| 6004 | 192.168.254.5:5060 | 108 |

The SBC 118 changes the domain part of the contact uniform resource indicator (URI) for each device to the SBC private IP address, 10.152.128.253 in this example, and the opened port. For multiple contact devices, upon detecting a multiple contact, prior art SBCs (e.g., 118) would either: open a new listening port and use this port to differentiate the multiple contacts, which may lead to a large number of open ports; or, specially tag the user part of the contact URI to differentiate it from the other registrations of the multiple contact. Some state of the art softswitches cannot handle these specially tagged contact URIs.

The softswitch 120 uses the E164 directory number (DN1, DN2, and DN3) in the user-part of the contact URI for each internal device 104, 106, 108, 110. So, in the private network 114 internal SIP devices, e.g., keysets 104, 106, 108 and 110, are differentiated in part by the user part (the DN in this example) of the contact URI, which is different for some, but not all, internal devices 104, 106, 108, 110 on the private network 114. If the SBC 118 uses the same inside (private DMZ) IP address and port for all messages from all external devices to save/minimize internal connections; then, the domain part of the URI is the same to all external devices. Therefore two different external contacts from the private network 114 differ in external URI only by the user part.

Any call originating from either multiple contact keyset 104, 108 has the same user part. Simultaneous calls from both keysets 106 and 110 may originate from both primary lines (DN1 and DN2), both secondary lines (DN2 and DN1) or a conference call, both on the same line DN1 or DN2. Thus, multiple contacts and keysets provide useful features, but may have problems connecting through the SBC 118 to reach the softswitch 120. Using prior approaches, these problems occurred in SIP messages on the interface between the SBC 118 and the softswitch 120, whenever both the user part and the domain part of the contact URI were the same when arriving in the softswitch 120. The present invention seamlessly resolves this ambiguity.

Figure 1B:
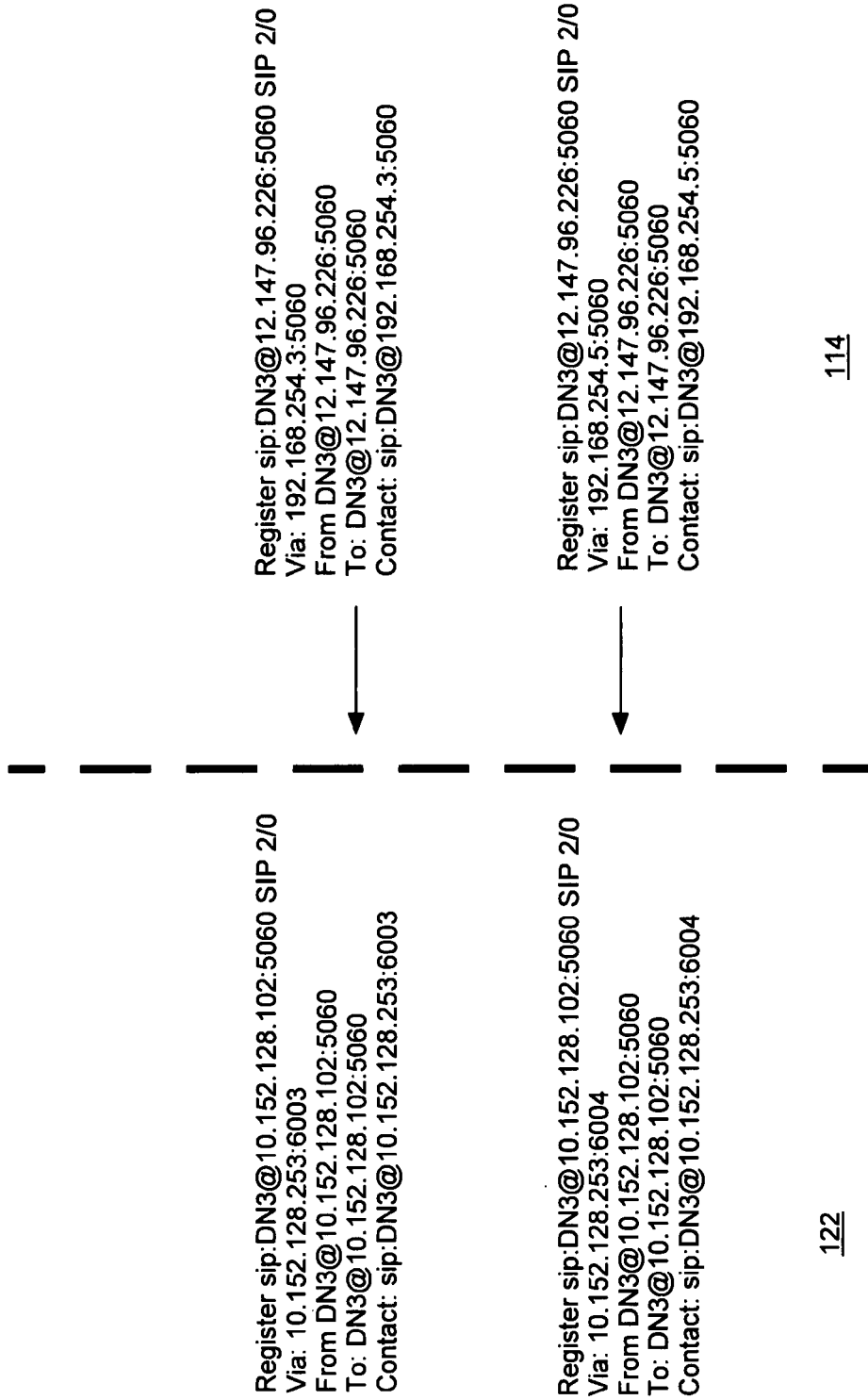

FIG. 1B shows an example of SIP message headers for external calls and how a prior art system, e.g., 100, handled external calls with multiple contact phones 104 and 108. Each standard SIP register message includes a Request URI header (Request URI), a contact header (Contact), a To header, a From header, and a Via header. So, in the private network 114, the Via header is 192.168.254.3:5060 for device 104 and 192.168.254.5:5060 for device 108, respectively. Both the To and From headers are the same for each device, i.e., DN3@12.147.96.226:5060. The Contact header is based on the private address of each phone, i.e., sip:DN3@192.168.254.3:5060 for device 104 and sip:DN3@192.168.254.5:5060 for device 108. The Request URI header includes the directory number as the user part and the domain part is based on the public address of the SBC 118 which represents the softswitch 120. It is the same for both devices, i.e., sip:DN3@12.147.96.226:5060 SIP2/0, the URI of the SBC port assigned for listening for incoming messages from the private network 114.

The SBC 118 creates a unique port for each registering phone, i.e., 10.152.128.253:6001, 10.152.128.253:6002, 10.152.128.253:6003, 10.152.128.253:6004. The SBC 118 opens the respective ports to the softswitch 120 and listens on all opened ports. Also, the SBC 118 substitutes the private network 114 IP address and port pairs in the Contact header in the SIP messages to/from private network devices 104, 106, 108, 110 in the signaling path and replaces the Via header with its own IP address 10.152.128.253 and respective listening port. The SBC 118 then substitutes the public address of the SBC 118 with the private data center softswitch 120 IP address (i.e., private IP address, 10.152.128.102) and listening port (i.e. 5060). So, for this multiple contact example, in the DMZ 122 the SIP messages from different keysets 104, 108 are nearly indiscernible with the only difference being the port number in the SIP Contact and Via headers.

Specifically for this example, in the DMZ 122 the Via header is 10.152.128.253:6003 for device 104 and 10.152.128.253:6004 for device 108, respectively. The Request URI, To and From headers are the same DN3@10.152.128.102:5060. The Contact header is based on the URI, i.e., sip:DN3110.152.128.253:6003 for device 104 and sip:DN3@10.152.128.253:6004 for device 108.

Thus, for this prior art system, the number of ports required is determined by the number of devices that register. However, it is desirable to keep the number of data center connections between the SBC and the SIP Server/Registrar to the bare minimum. Further, opening multiple ports increases the number of active connections that the network must maintain. Maintaining these connections consumes processing power in each connected device, increases network complexity and the complexity of the connections. Also, some SIP Registrars rely on the user part to detect that a user is registering from multiple locations. Since the softswitch may change the user part of each respective contact URI, changing the user part can cause problems for the SIP Registrar. Moreover, parsing and maintaining attached URI tags increases processing power consumption because internally, address associations are based on IP:port structures, e.g., 192.168.254.3:5060, not the URI tags.

Figure 2A:
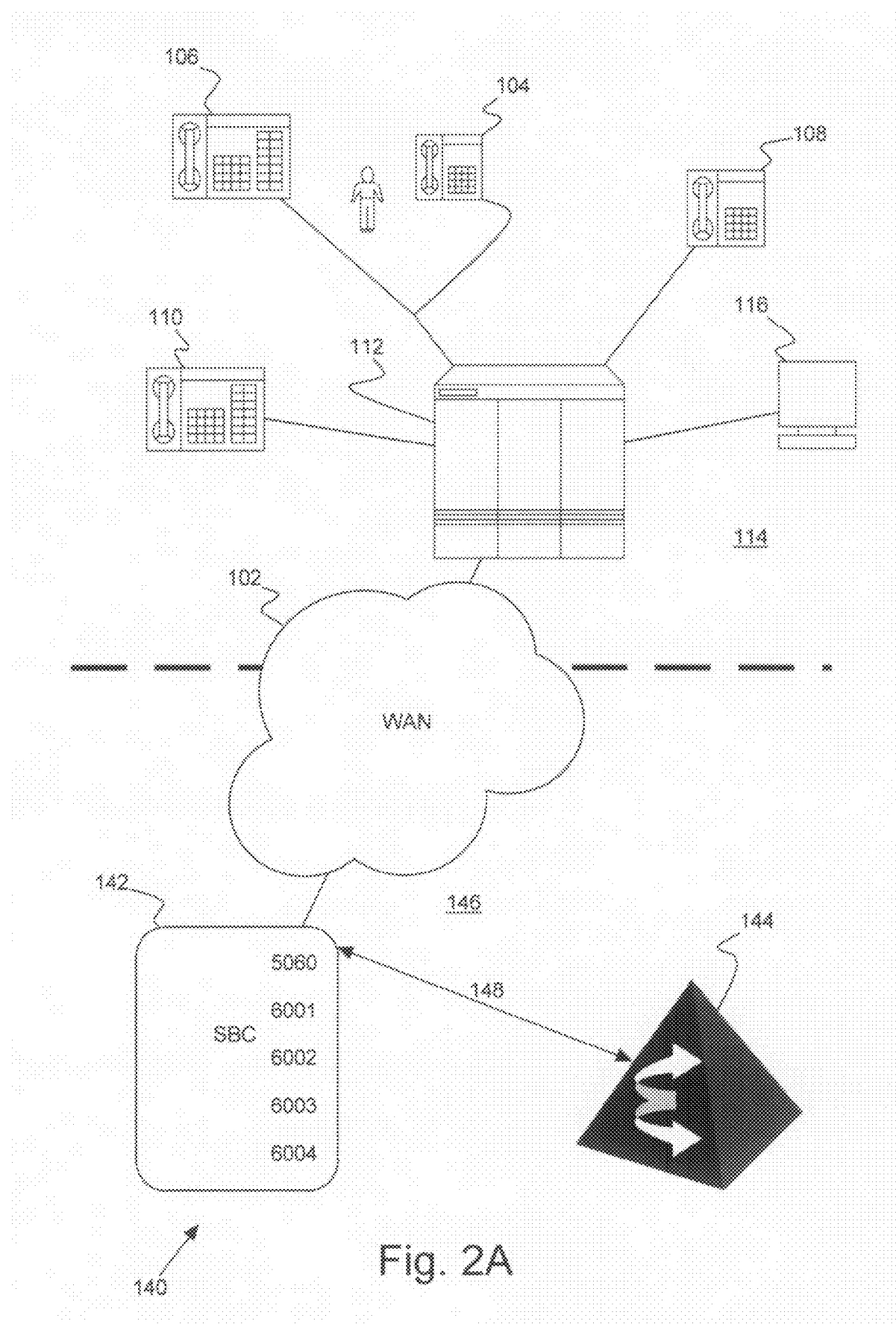
FIGS. 2A-B, which show a preferred IP communications system and SIP message headers for external calls tagged according to a preferred embodiment of the present invention.
Figure 2B:
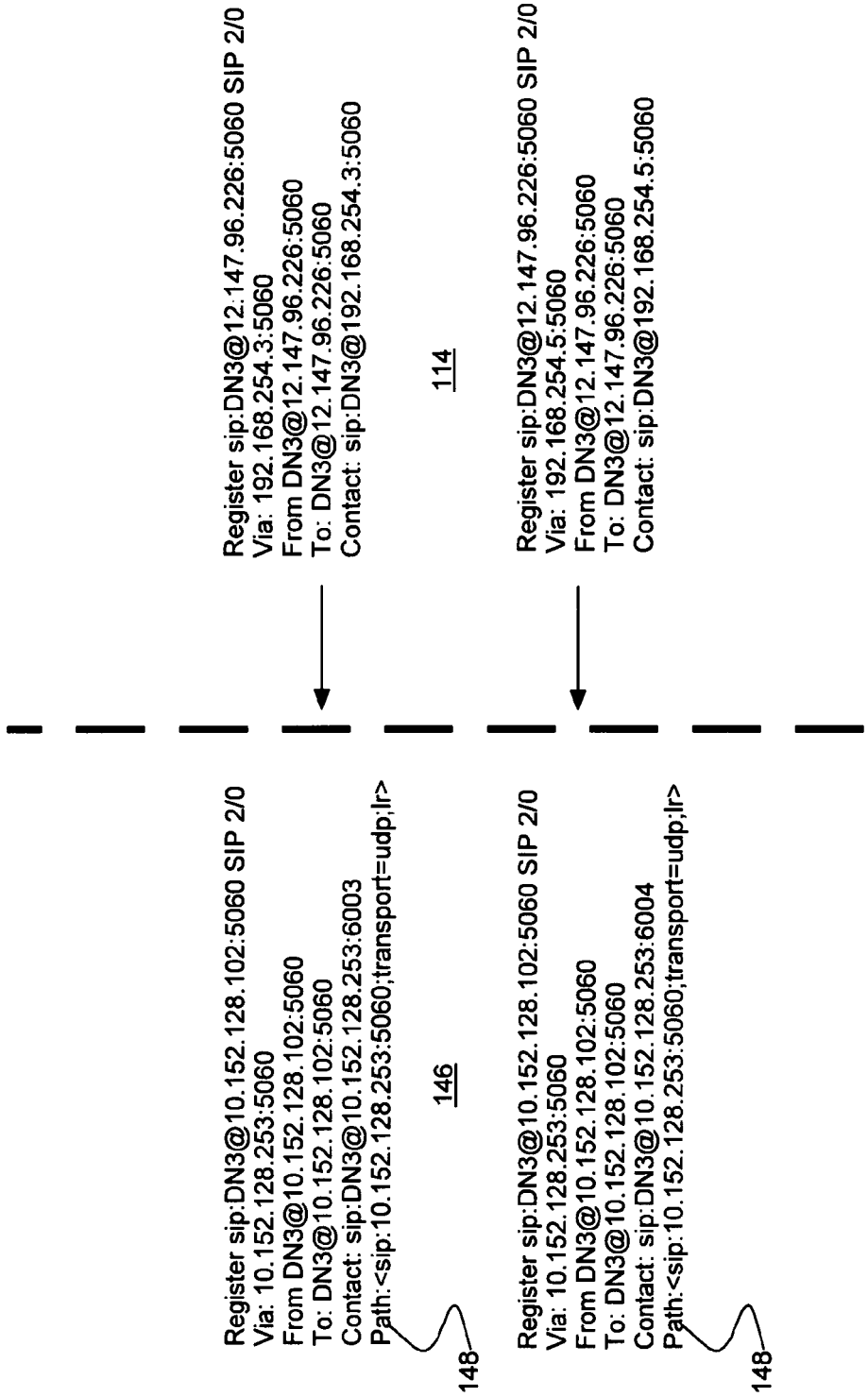

By contrast, the present invention reduces and nearly eliminates port occupancy as can be seen from FIGS. 2A-B, which show a preferred IP communications system 140 and SIP message headers for external calls tagged according to a preferred embodiment of the present invention. Specifically, FIG. 2A shows the preferred IP communications system 140 with a SBC 142 and softswitch 144 in the data center 146 and handling VoIP communications. For this example, the private network 114 and WAN 102 are substantially the same and configured substantially the same as shown in the example of FIG. 1A, with like features labeled identically. A preferred SBC 142 differentiates multiple contacts without changing the user part of the URI, and without opening multiple listening ports towards the SIP registrar. According to the present invention, all private network keysets 104, 106, 108 and 110 share a single SBC port 148, e.g., 5060, to the softswitch 144. The softswitch 144 may be, for example, a SURPASS™ hiQ 8000™ VoIP Softswitch/Media Gateway Controller (MGC) from Siemens Communications, Inc.

FIG. 2B shows an example of SIP message headers generated for external calls with multiple contact keysets 104 and 108. Instead of opening a listening port on the communication path with the softswitch for each incoming registration; the SBC 142 assigns a unique port number without listening on the actual port. The SBC 142 also adds the Path header 148 to SIP REGISTER messages in the data center 146. Thus, SIP messages from devices 104 and 108 are both tagged with path header 148 to provide SIP message path. The path header 148, Path:<sip:10.152.128.253:5060; transport=udp;lr>, causes all outbound SIP messages from the softswitch 144 to the registered contact to be directed through the single port 5060. Since the SBC already handles SIP traffic conversion, listening on the single port 5060, identifies SIP messages, the SBC 142 modifies headers and directs the SIP messages appropriately. Thus, by adding a path header 148 the SBC 142 makes the registration as transparent as possible to the softswitch 144. The softswitch 144 seamlessly uses standard SIP messages to communicate with all the phones in the private network, communicating through a single port on the SBC 142.

Figure 3:
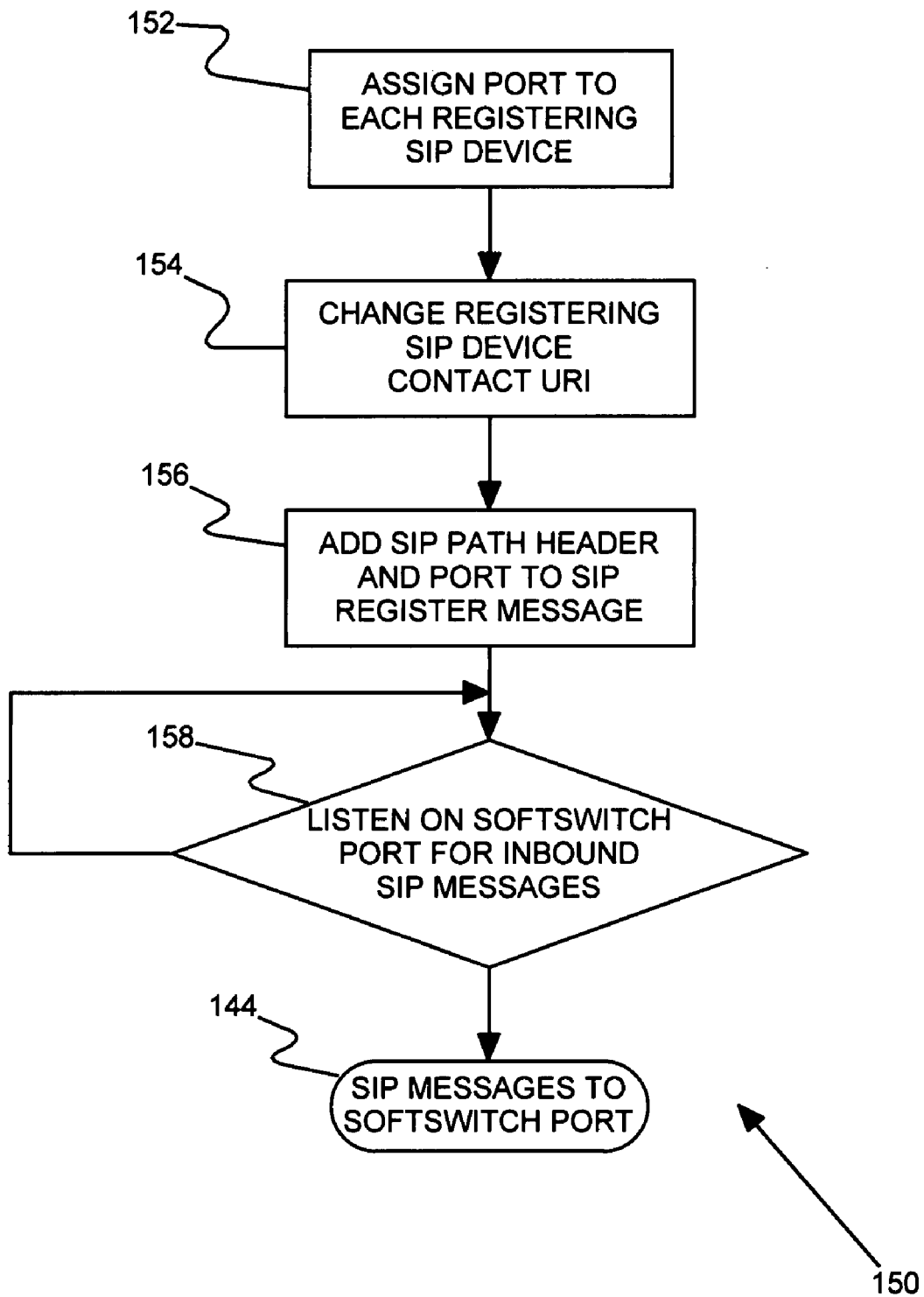
FIG. 3 shows an example of a method of generating SIP message headers for calls with multiple contact keysets.

FIG. 3 shows an example of a method 150 of generating SIP message headers tagged according to a preferred embodiment of the present invention. In step 152, the SBC 142 assigns a different port to each registering SIP device 104, 106, 108 and 110. Then in step 154, the SBC 142 changes the domain part of the registering SIP device's Contact URI (e.g., 192.168.254.xxx) to the SBC's inside IP address (10.152.128.253) and the assigned port, 6001-6004 in this example. In step 156 the SBC 142 adds a SIP Path Header to the SIP register message with the single port (5060) opened towards the softswitch 144. This new Path header causes the softswitch 144 to add a new route header to any outbound SIP dialog initiating SIP message. The route header is the same for all registered SIP devices 104, 106, 108, 110 and forces all SIP messages through the single opened port 148. In step 158 the SBC 142 listens on that port for inbound SIP messages from the SIP Server. Thereafter, in step 160 SBC 142 sends SIP messages to the softswitch 144 using the single port 148 that was opened towards the softswitch 144.

Thus, a preferred softswitch can operate with any state of the art softswitch, even softswitches that cannot handle the tagging of the user, but are capable of supporting multiple contacts and keysets behind SBCs. Accordingly, the present invention minimizes the number of softswitch ports required and, correspondingly, the number of data center connections between the SBC and the SIP Server/Registrar. Further, because the number of opened ports is minimized, the present invention provides for a simpler, less complex network with much simpler connections. The number of active connections that the network must maintain is also minimized, significantly reducing processing power over what otherwise would be consumed by connected devices. Processing power is also reduced because it is no longer necessary to parse and maintain URI tags attached to SIP messages. Also, the present invention eliminates problems for SIP Registrars that rely on the user part to detect that a user is registering from multiple locations.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A private communications network comprising:
   a plurality of communications devices at private communications network stations;
   a proxy server coupling said plurality of communications devices to a network;
   a Session Border Controller (SBC) connected to said network and listening for private network voice communications originating from one of said plurality of communications devices, said SBC adding a path header to identified said private network voice communications; and
   a softswitch adding a route header to said identified private network voice communications responsive to said path header, all identified private network voice communications passing through a common SBC port.

2. A private communications network as in claim 1, wherein said private network voice communications are Voice over Internet Protocol (VoIP) communications.

3. A private communications network as in claim 2, wherein said plurality of communications devices are Session Initiation Protocol (SIP) devices and said VoIP communications are SIP messages.

4. A private communications network as in claim 3, wherein said path header is a SIP path header added to SIP register messages.

5. A private communications network as in claim 1, wherein said SBC includes a plurality of ports, said SBC assigning a unique port number to each registering one of said plurality of communications devices.

6. A private communications network as in claim 5, wherein said SBC changes the contact uniform resource indicator (URI) for each registering one, each changed said contact URI including a respective said unique port number.

7. A method of managing private network calls, said method comprising the steps of:
   a) listening for private network voice communications originating from private network communications devices;
   b) adding a path header to identified said private network voice communications;
   c) adding a route header to said identified private network voice communications responsive to said path header; and
   d) passing all identified private network voice communications from a softswitch through a common SBC port.

8. A method of managing private network calls as in claim 7, wherein the step (a) of listening for private network voice communications comprises monitoring Session Initiation Protocol (SIP) messages associated with devices on said private network.

9. A method of managing private network calls as in claim 8, wherein the step (b) of adding said path header adds a SIP path header to SIP register messages.

10. A method of managing private network calls as in claim 9, wherein the step (c) of adding said route header forces SIP messages through said common Session Border Controller (SBC) port, said SBC listening for private network voice communications in step (a) over said common SBC port.

11. A method of managing private network calls as in claim 7, wherein the step (a) of listening for private network voice communications comprises assigning a different Session Border Controller (SBC) port to each registering communications device.

12. A method of managing private network calls as in claim 11, wherein the step (a) of listening for private network voice communications further comprises changing the contact uniform resource indicator (URI) of private network voice communications over each assigned SBC port.

13. A method of managing private network calls as in claim 12, wherein said contact URI is changed to the SBC internal domain and a respective assigned SBC port.

14. A method of managing private network calls, said method comprising the steps of:
   a) listening in a Session Border Controller (SBC) for private network voice communications originating from private network communications devices, said SBC including a plurality of ports and a single port opened to a softswitch;
   b) assigning a different one of said plurality of ports to each registering communications device;
   c) changing the contact uniform resource indicator (URI) of private network voice communications at each assigned SBC port;
   d) adding a path header to said private network voice communications over said each assigned SBC port;
   e) adding a route header to said private network voice communications responsive to said path header; and
   f) passing all said private network voice communications through said single port.

15. A method of managing private network calls as in claim 14, wherein the step (a) of listening for private network voice communications comprises monitoring Session Initiation Protocol (SIP) messages for SIP messages associated with devices on said private network.

16. A method of managing private network calls as in claim 15, wherein the step (d) of adding said path header adds a SIP path header to SIP register messages.

17. A method of managing private network calls as in claim 16, wherein the softswitch adds the route header in step (e) responsive to said path header, said SBC listening for private network voice communications in step (a) over said single port.

18. A method of managing private network calls as in claim 17, wherein the step (b) of changing the contact URI comprises changing said contact URI to the SBC internal domain and a respective said assigned SBC port.

* * * * *